Fig. 1.

INVENTOR.
NILS HOGLUND

United States Patent Office 3,428,038
Patented Feb. 18, 1969

3,428,038
APPARATUS FOR FORMING CONTOURS
Nils Hoglund, Short Hills, N.J., assignor to Hoglund Engineering and Manufacturing Company, Inc., Berkeley Heights, N.J.
Filed Oct. 18, 1965, Ser. No. 497,240
U.S. Cl. 125—11      4 Claims
Int. Cl. B28d 1/16; B24b 9/06

ABSTRACT OF THE DISCLOSURE

Apparatus for forming contours on a work piece including a pair of oppositely disposed housing slides mounted on a base and biased toward each other and against a wedge-shaped cam slidably mounted on the base and movable transversely of the movement of the housing slides, the cam being adjusted by micrometer means, each housing supporting a power driven dressing wheel.

---

My invention relates to wheel dressing apparatus for thinning and forming contours on grinding wheels of grinding apparatus where extreme accuracy is required in fractions of ten thousandths of an inch.

The principal object of my invention is to provide such an apparatus which is capable of moving the dressing wheels accurately through minute distances.

Briefly, apparatus made according to my invention includes a pair of housing slides slidably mounted on a support or base slide and movable toward and from each other. These housing slides carry oppositely disposed dressing wheels and their driving motors. A wedge-shaped cam, micrometer controlled, is also slidably mounted on the support or base slide. The housing slides are provided with followers and biasing means for biasing the followers into contact with the opposite sides of the wedge-shaped cam. The cam reduces the movement of the housing slides relative to the movement of said cam and the rotation of the micrometer screw attached to the cam so that the housing slides can be moved very accurately toward and from each other through extremely small distances.

Referring to the drawings:

FIGURE 6 is a section taken along the line 6—6 of FIGURE 3a; and

Referring to the drawings, apparatus made according to my invention includes a base 10 on which is slidably mounted a base slide 11. An adjusting screw 12 is rotatably secured to base slide 11 and is threaded into base 10.

The base slide is provided with end mmebers 14 and 15 between which extends a bridge type slide guide 16. The dressing wheel slide housings 20 and 21 are slidably mounted on slide guide 16 by means of ball bearing assemblies such as 22 and 23. The slide housings 20 and 21 have yokes 25 and 26 through which spring guides 27 and 28 slidably extend. The guides 27 and 28 are fixed to the slide housing members 14 and 15. Compression springs 30 and 31 are supported on guides 27 and 28 and bias the slide housings 20 and 21 toward each other.

Accordion type dust covers 33, 34, 35 and 36 are connected between the ends of the housing slides and the end members 14 and 15 and the central housing 38.

Figure 1:
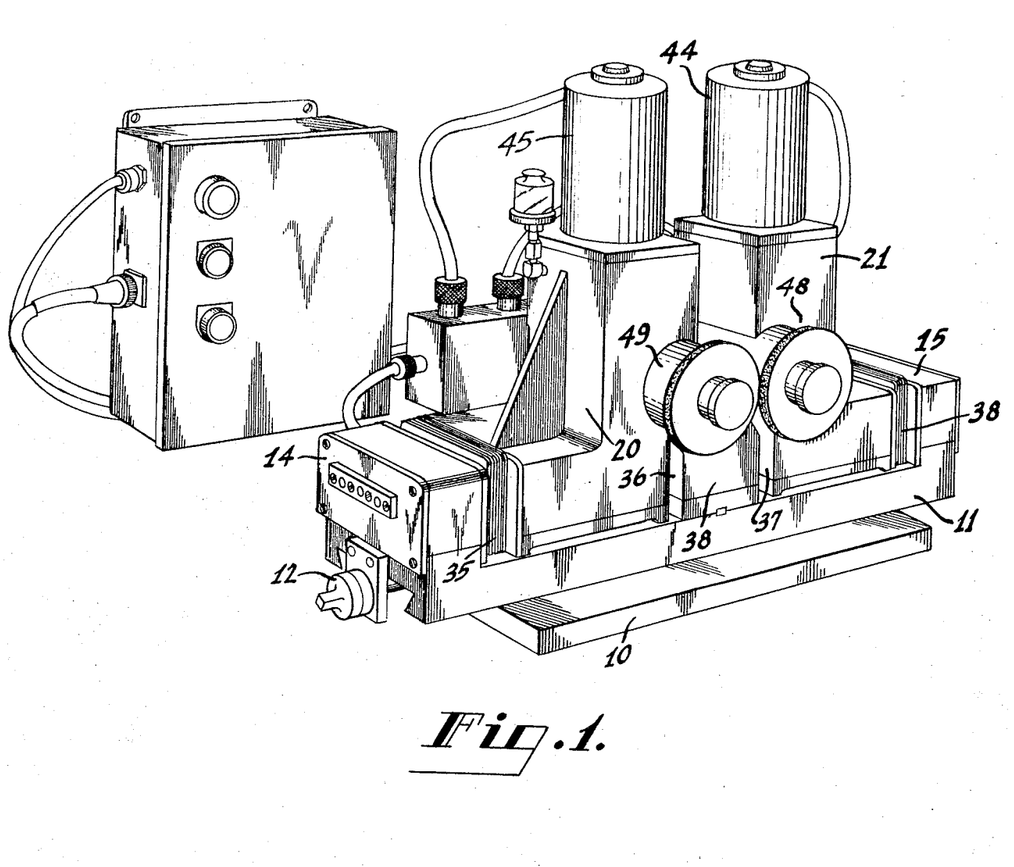
FIGURE 1 is a perspective view of apparatus made in accordance with my invention.
Figure 2:
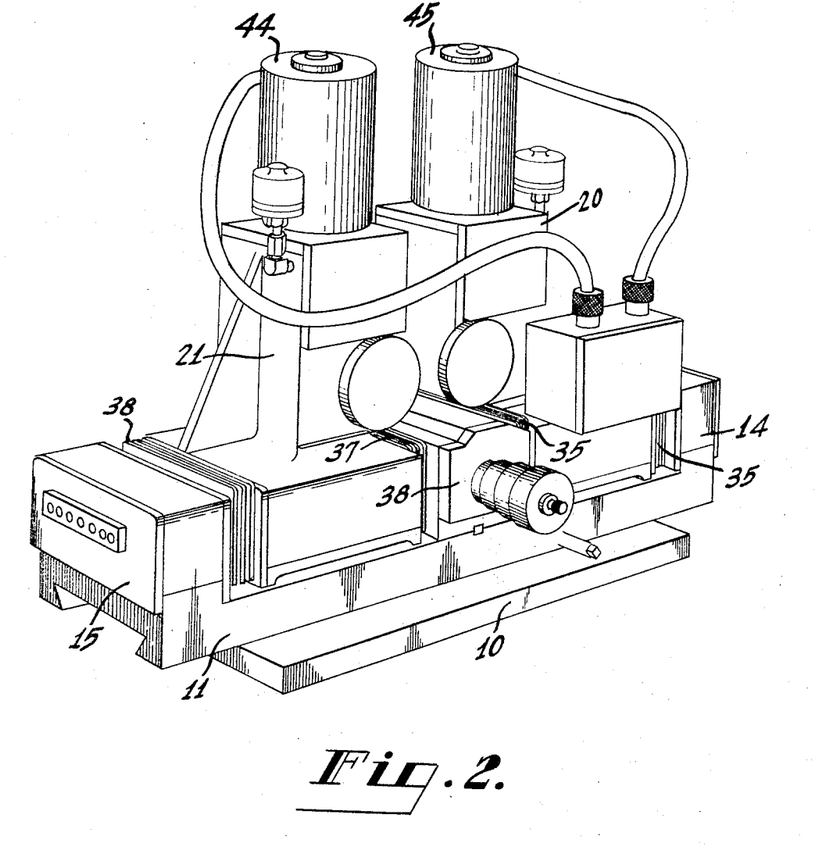
FIGURE 2 is a perspective view showing the reverse side of the apparatus shown in FIGURE 1.
Figure 3A:
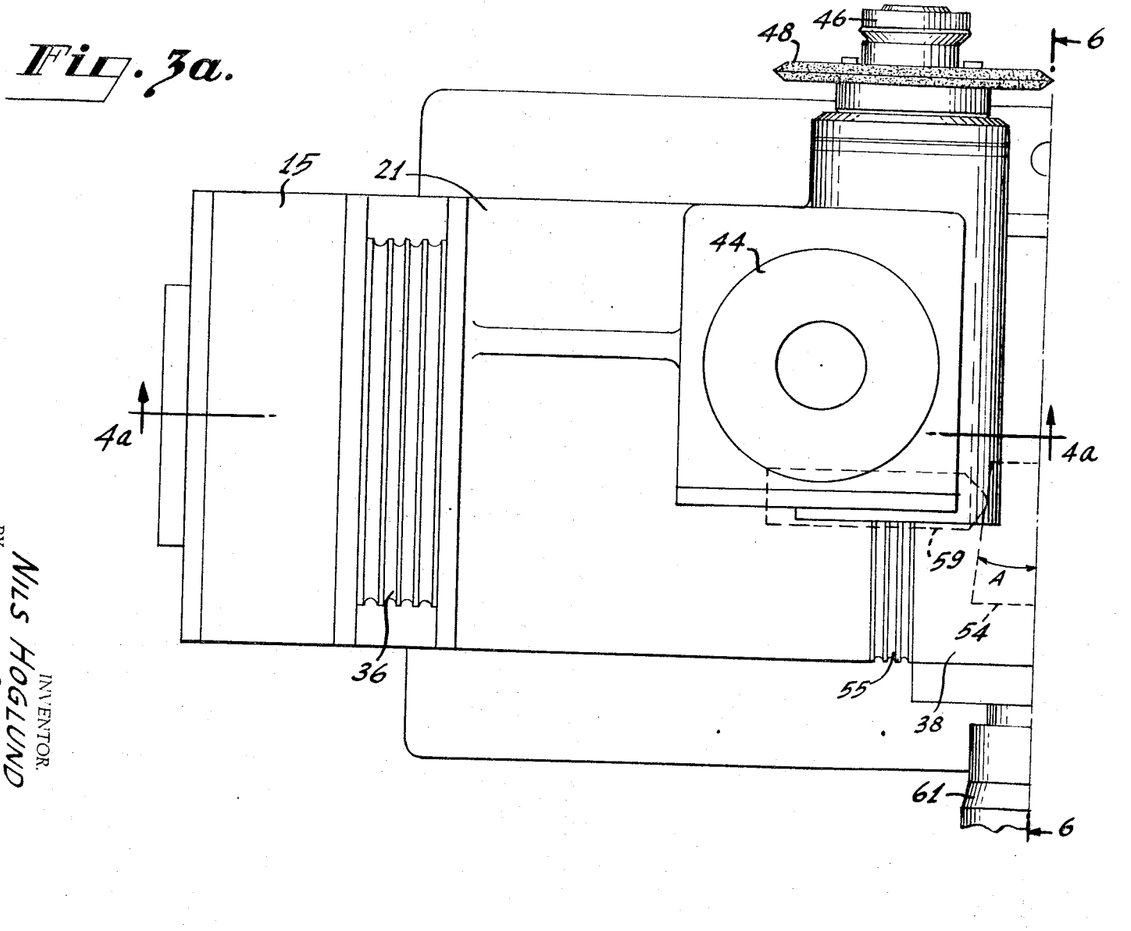
FIGURES 3a and 3b together are a plan view of the apparatus shown in FIGURES 1 and 2.
Figure 3B:
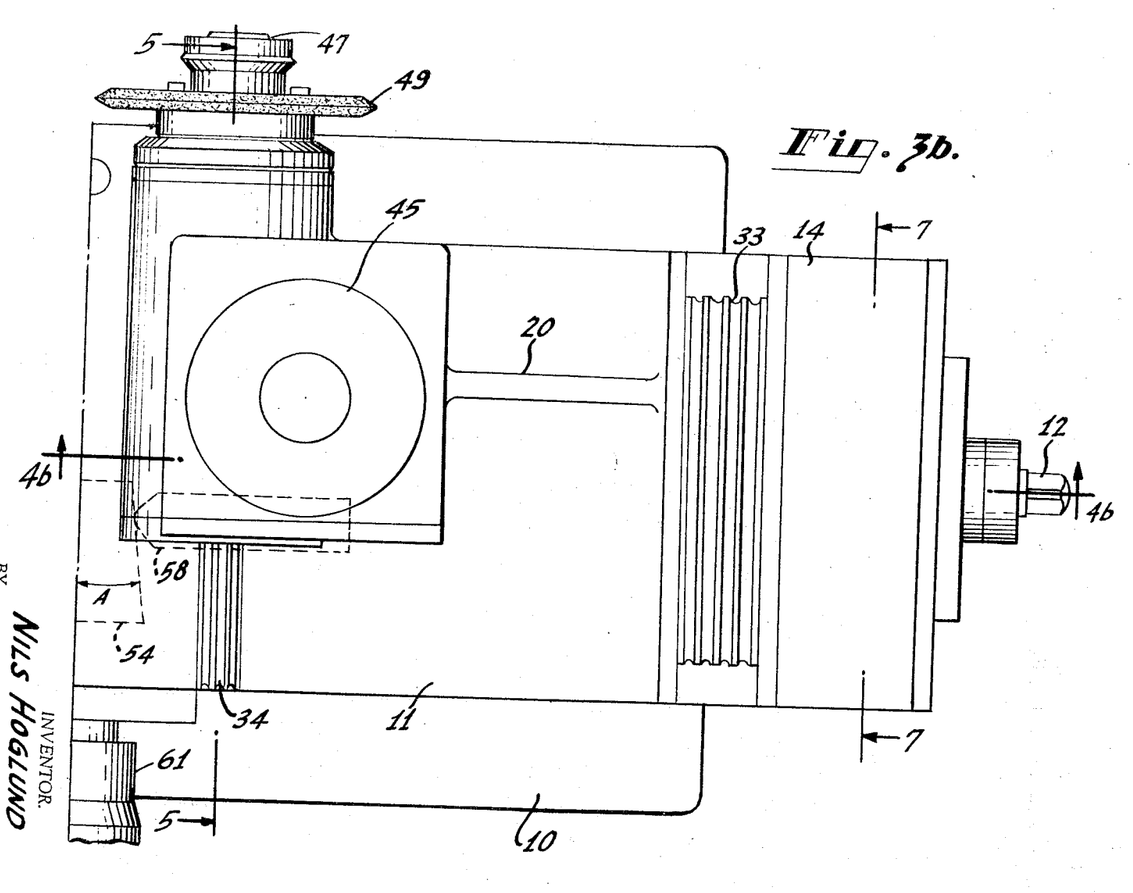
Figure 4A:
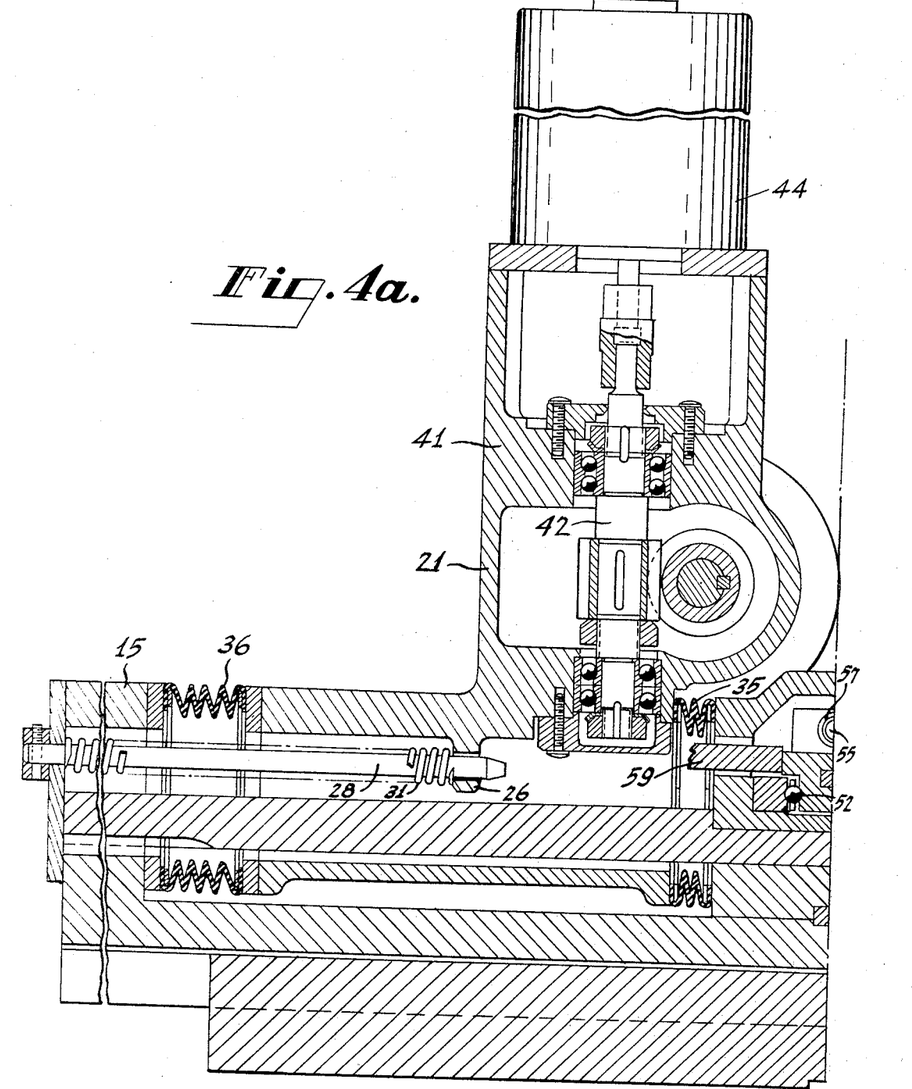
FIGURE 4a is a section taken along the line 4a—4a of FIGURE 3a with parts removed to show details of construction.
Figure 4B:
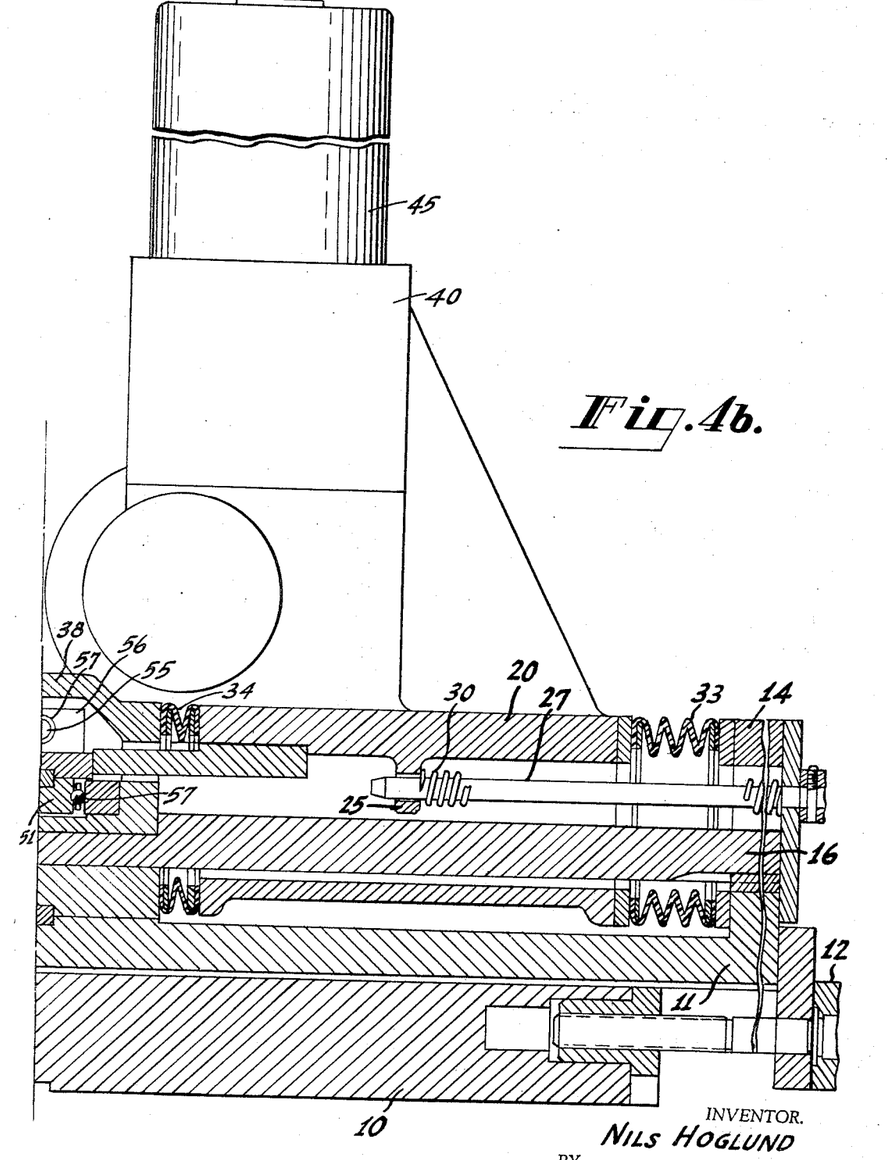
FIGURE 4b is a section taken along the line 4b—4b of FIGURE 3b with parts removed to show details of construction.
Figure 5:
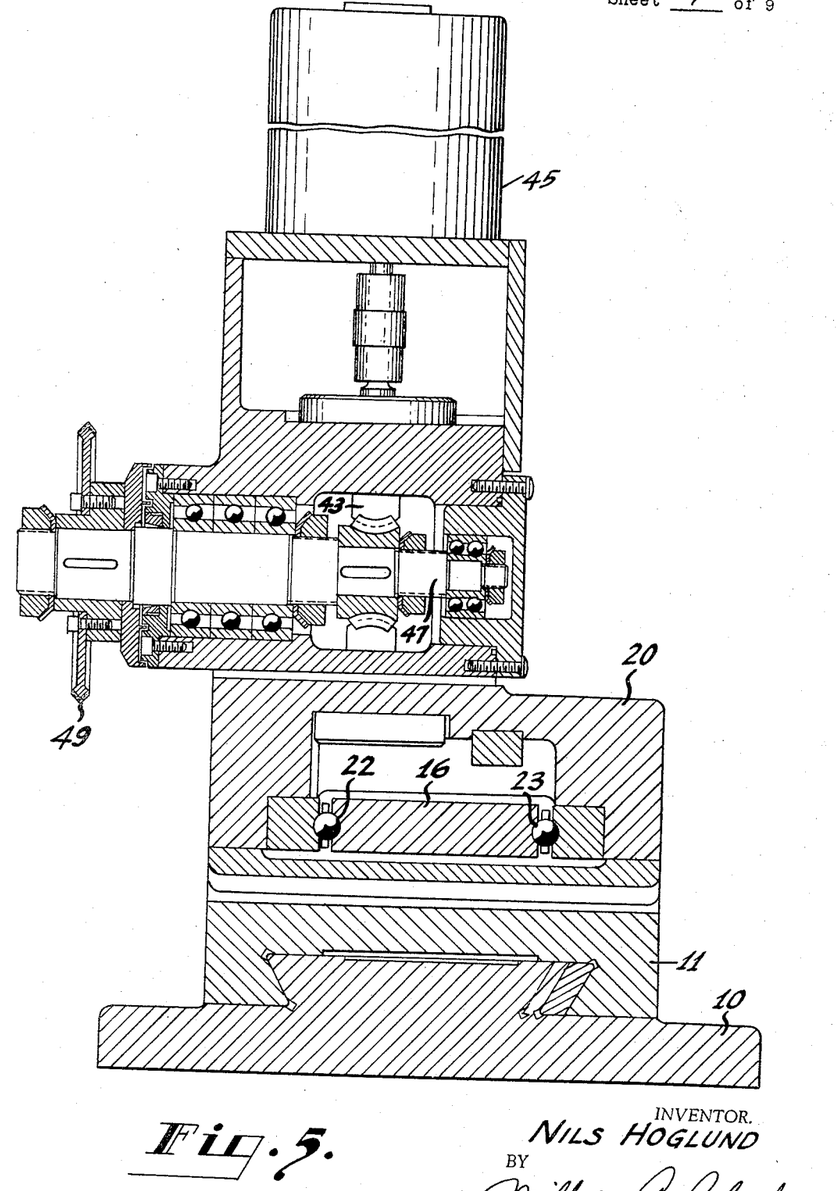
FIGURE 5 is a section taken along the line 5—5 of FIGURE 3b.
Figure 6:
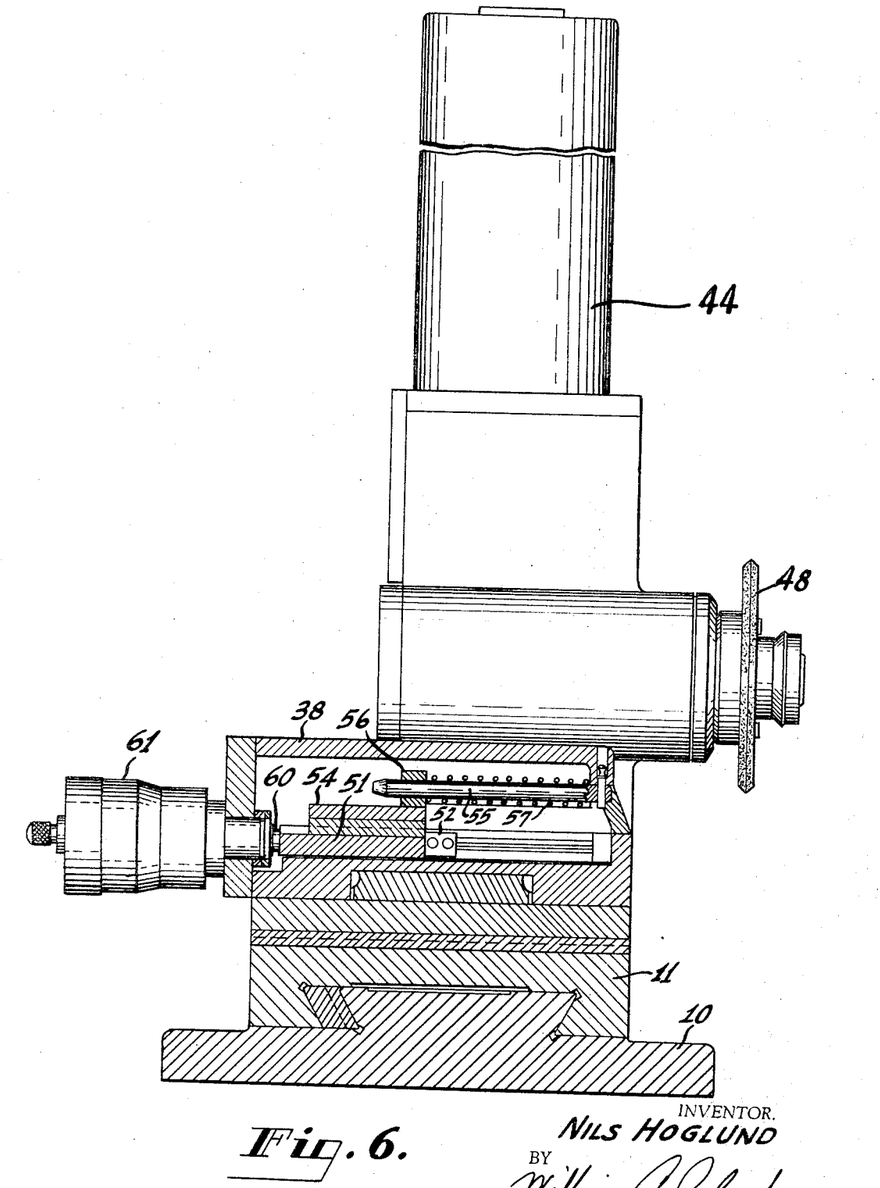
Figure 7:
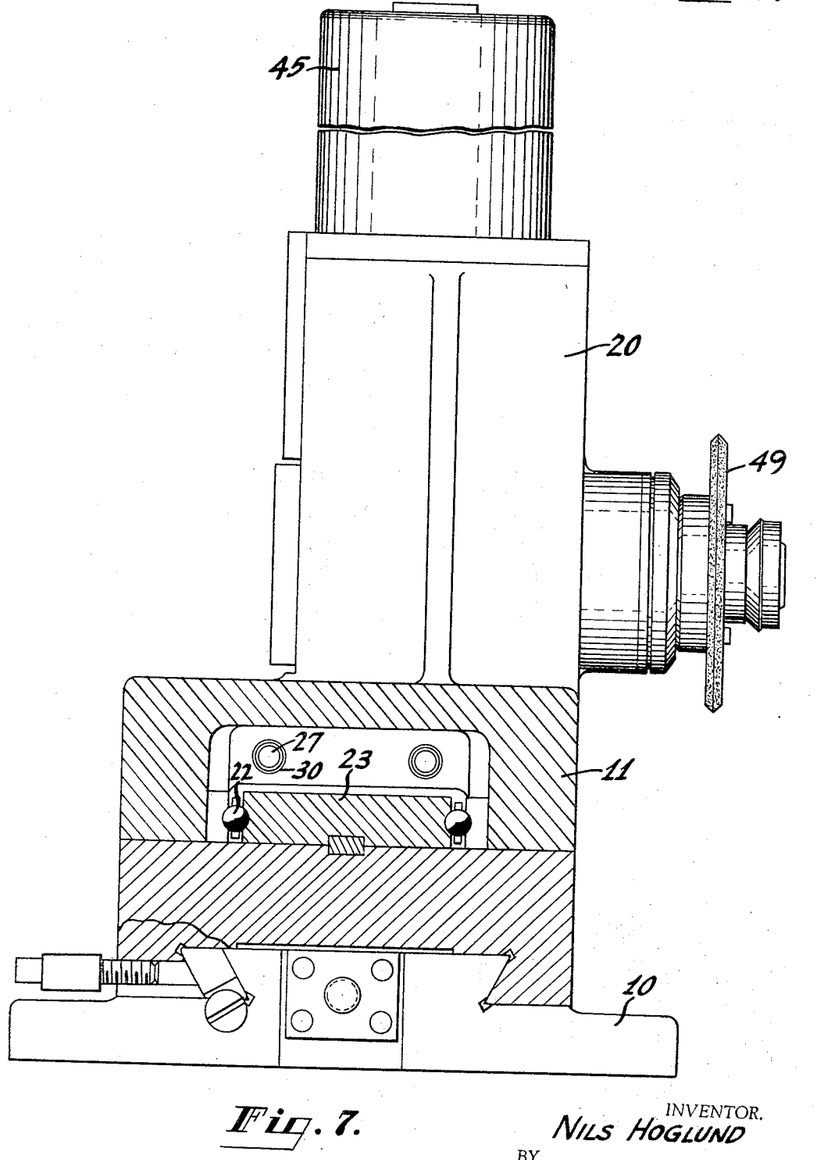
FIGURE 7 is a section taken along the line 7—7 of FIGURE 3b.

The slide housings 20 and 21 have upper compartments 40 and 41 in which are rotatably supported in ball bearing assemblies the drive shafts, one of which, 42, is shown in FIGURE 4a and the other, 43, in FIGURE 5. These in turn are driven preferably by electric motors 44 and 45 mounted on the slide housings 20 and 21. These motors are coupled to the drive shafts such as 42 (FIGURE 4a) and 47 (FIGURE 5) which support and drive the dressing wheels 48 and 49.

To control movement of the slide housings 20 and 21 and dressing wheels 48 and 49 for minute and accurate movement, accurate to between 40 and 50 millionths of an inch, I provide a movable tapered cam within the central housing 38 which contacts the followers on slide housings 20 and 21.

Referring to FIGURES 3a, 3b, 4a, 4b and 6, within housing 38, a slide 51 is provided slidably mounted on ball bearing assemblies 52 and 53. Mounted on this slide is the tapered cam 54. To bias the slide 51 and cam 54 there is provided a spring guide 55 fixed to housing 38 and passing through a yoke 56 on slide 51. A compression spring 57 is supported on the spring guide 55 between the housing 38 and yoke 56. Housing slide 20 has fixed thereto a follower 58 in contact with one side of cam 54 and housing slide 21 has fixed thereto a follower 59 in contact with the other side of the cam 54. The slide 51 is secured to the shaft 60 of the micrometer head 61 for minute adjustment.

The tapered cam 54 which can be moved back and forth by the micrometer assembly causes a reduction of the movement of the housing slides relative to the movement of the cam and the micrometer screw along their lengths so that extremely small or minute movement of the housing slides 20 and 21 with their dressing wheels results. The angle A between the center line of the cam 54 can be made very small so that extremely small increments of the slide housings 20 and 21 result.

In dressing a grinding wheel or other work piece the wheel may be moved back and forth between the dressing wheels, or the dressing apparatus may be moved back and forth toward the grinding wheel.

What is claimed is:

1. Apparatus for accurately forming contours on a work piece including:
    a support,
    a pair of housing slides slidably mounted on said support and movable toward and from each other,
    power driven dressing wheels mounted on said housing slides,
    means connected between said support and said housing slides for biasing said housing slides toward each other,
    a wedge-shaped cam having tapered sides slidably mounted on said support between said housing slides and movable transversely of the movement of said housing slides,
    a micrometer adjusting means connected between said support and said cam for moving said cam back and forth in minute increments between said housing slides,
    and followers mounted on said housing slides in contact with the tapered sides of said cam for causing movement of said housing slides upon movement of said cam, said cam causing reduction of movement of said slide housings relative to the movement of said cam.

2. Apparatus for accurately forming contours on grinding wheels including:
a support,
a pair of housing slides slidably mounted on said support and movable toward and from each other,
a motor driven dressing wheel mounted on each slide,
means connected between said support and said housing slides for biasing said housing slides toward each other,
a wedge-shaped cam having tapered sides slidably mounted on said support between said housing slides and movable transversely of the movement of said housing slides,
adjusting means connected to said cam for moving said cam back and forth between said housing slides in minute increments,
and a follower mounted on each of said housing slides, said followers contacting the tapered sides of said cam for causing movement of said housing slides upon movement of said cam, said cam causing reduction of movement of said slide housings relative to the movement of said cam.

3. Apparatus for accurately forming contours on grinding wheels including:
a support,
a pair of housing slides slidably mounted on said support and movable toward and from each other,
a motor driven dressing wheel mounted on each housing slide,
means connected between said support and said housing slides for biasing said housing slides toward each other,
a wedge-shaped cam having tapered sides slidably mounted on said support between said housing slides and movable transversely of the movement of said housing slides,
a micrometer screw adjusting means connected between said support and said cam for moving said cam back and forth in minute increments between said housing slides,
and a follower mounted on each of said housing slides in contact with the tapered sides of said cam for causing movement of said housing slides upon movement of said cam, said cam causing reduction of movement of said slide housing relative to the movement of said cam and rotation of said micrometer screw adjusting means.

4. Apparatus for accurately forming contours on grinding wheels including:
a support,
a pair of housing slides slidably mounted on said support and movable back and forth toward and from each other on said support,
a motor driven grinding wheel on each of said housing slides,
means connected between said support and said housing slides for biasing said housing slides toward each other,
a wedge-shaped cam having tapered sides slidably mounted on said support and movable transversely of the movement of said housing slides,
a micrometer screw adjusting means mounted on said support and in contact with said cam for moving said cam back and forth in minute increments,
means for biasing said cam against said micrometer screw adjusting means and a follower mounted on each of said housing slides in contact with the tapered sides of said cam for causing movement of said housing slides upon movement of said cam, said cam causing reduction of movement of said slide housings relative to the movement of said cam and rotation of the micrometer screw adjusting means.

References Cited

UNITED STATES PATENTS

| 1,619,736 | 3/1927 | Kaufmann et al. | 51—84 |
| 1,828,663 | 10/1931 | Jopp | 51—80 |
| 2,186,363 | 1/1940 | Candee et al. | 125—11 |
| 2,333,985 | 11/1943 | Clark | 125—11 X |
| 2,377,822 | 6/1945 | Starn | 125—11 |
| 2,480,001 | 8/1949 | Czarnikow | 74—89 |
| 2,904,936 | 9/1959 | Veith | 51—165 X |

FOREIGN PATENTS 747,643    4/1956    Great Britain.

LESTER M. SWINGLE, Primary Examiner.

U.S. Cl. X.R.

51—80, 165